Oct. 26, 1937.  G. P. MIZELL  2,096,995

DEPTH RECORDER FOR A WELL DRILL

Filed July 5, 1935  3 Sheets—Sheet 1

Geo. P. Mizell, Inventor

Jesse R. Stone & Lester B. Clark

Attorneys

Oct. 26, 1937.　　　　G. P. MIZELL　　　2,096,995
DEPTH RECORDER FOR A WELL DRILL
Filed July 5, 1935　　　3 Sheets-Sheet 2
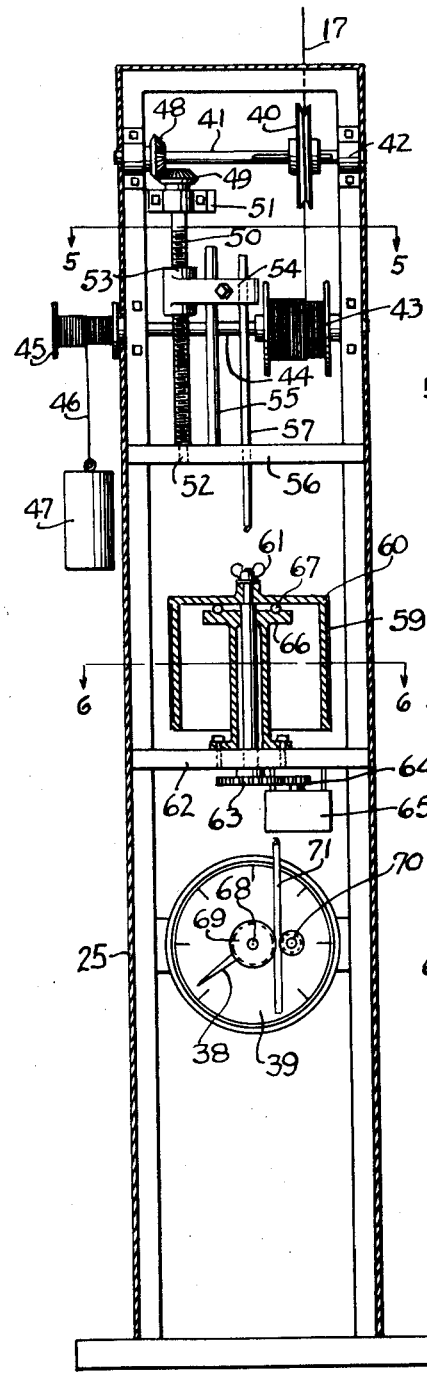
Fig. 3.
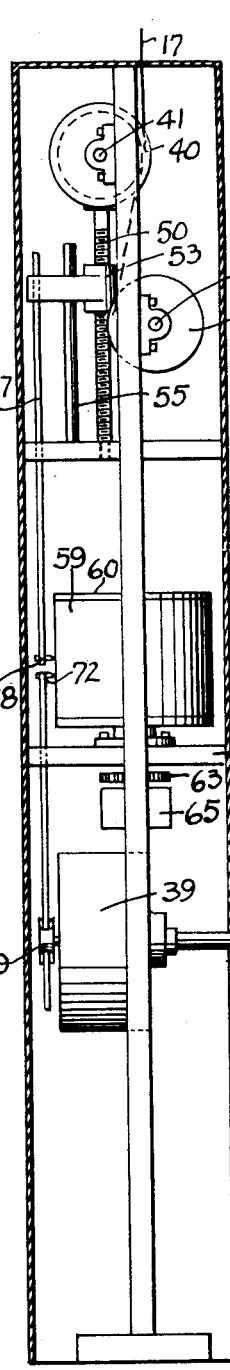
Fig. 4.
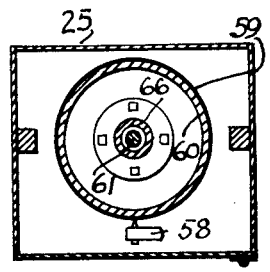
Fig. 5.
Fig. 6.
Inventor
Geo. P. Mizell
Jesse R. Stone
Lester B. Clark
By
Attorneys Oct. 26, 1937.    G. P. MIZELL    2,096,995
DEPTH RECORDER FOR A WELL DRILL
Filed July 5, 1935    3 Sheets-Sheet 3

Inventor
Geo. P. Mizell
Jesse P. Stone
&
Lester B. Clark
Attorneys

Patented Oct. 26, 1937

2,096,995

UNITED STATES PATENT OFFICE 2,096,995

DEPTH RECORDER FOR A WELL DRILL

George P. Mizell, Dayton, Tex.

Application July 5, 1935, Serial No. 29,815

3 Claims. (Cl. 255—1)

My invention relates to a device for recording the speed of drilling and the weight simultaneously resting upon the drill as an indication of the type of formation through which the drill is progressing.

It is apparent that if a comparatively constant weight is rested upon the drill, the drill will progress at a comparatively constant rate unless the formation through which the drill is penetrating varies. Hence by noting the weight resting upon the drill and the speed with which the drill penetrates the formation I can determine the comparative hardness or penetrability of the formation being drilled.

It is an object of the invention to provide a device which will show the speed of drilling and make a visual record thereof simultaneously with the production of an adjacent record showing the weight resting upon the drill, thus enabling the driller to obtain a log of the well which will indicate not only the speed and weight employed but the type of formation which is being drilled.

I further desire to provide a simple and accurate device for noting the speed of drilling.

I also desire to provide a means to record, for purposes of comparison, the weight resting upon the drill, said recording device being connected with any well known type of weight indicator having a dial thereon.

I also desire to provide a means for recording the drilling speed, said means including a cable equipped with a weight thereon to allow for changes in the length of the cable to which the recording mechanism is attached.

In the drawings herewith Fig. 1 is a side view partly in elevation and partly in longitudinal section illustrating the mounting of my device upon an ordinary rotary installation for well drilling.

Fig. 3 is an enlarged view of the recording device showing the mechanism mounted within the housing shown in Fig. 2.

Fig. 4 is a similar view in section through the housing and taken at right angles to the view shown in Fig. 3.

Fig. 5 is a transverse sectional view taken on the plane 5—5 of Fig. 3.

Fig. 6 is a similar transverse section on the plane 6—6 of Fig. 3; and

Figures 1, 2:
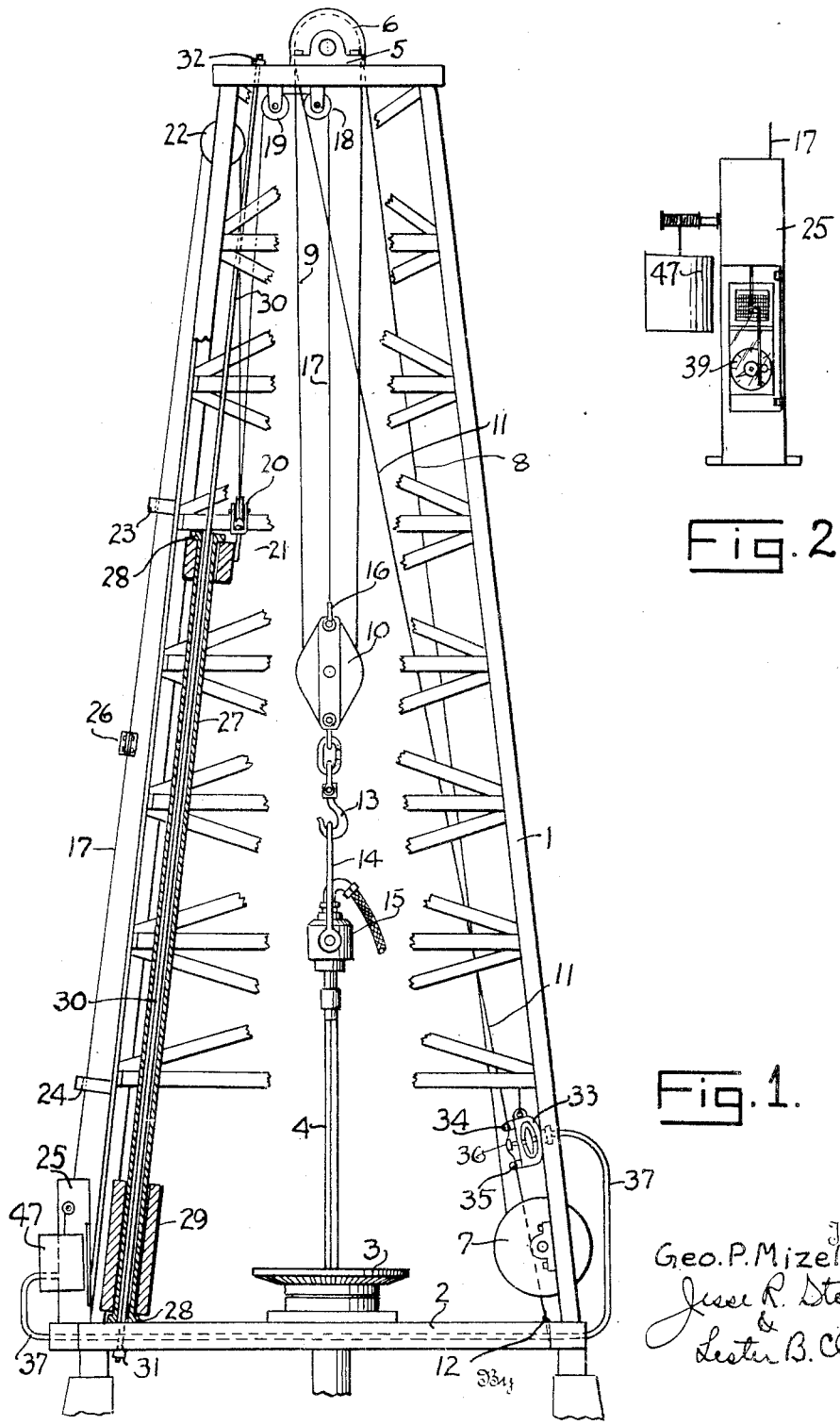
Fig. 2 is a small side elevation of the device employed for recording the weight and speed of drilling.

I have shown my device as mounted in connection with an ordinary derrick 1 having a derrick platform 2 at the lower end thereof upon which is supported the usual rotary drilling device 3 through which rotary motion is communicated to the drive stem or kelley joint 4.

At the upper end of the derrick 1 is the usual crown block 5 having a plurality of sheaves 6 thereon. Toward the lower end of the derrick and mounted between the supports thereof is a hoisting reel 7 through which the cable 8 is adapted to be handled in the drilling operation. Said cable passes over the sheave of the crown block and is then extended down at 9 around the traveling block 10 and then back up over the crown block sheave 6 and the dead line 11 is extended downwardly and attached to the derrick platform at 12.

The traveling block 10 is adapted to support the drill stem 4 and has a hook 13 thereon connected with the bail 14 of the swivel 15. This is of ordinary construction and need not be particularly described.

Connected with the upper end 16 of the traveling block 10 is a line 17, which is passed over a pair of pulleys 18 and 19 on the upper end of the derrick and extended downwardly around a pulley 20 secured to the upper end of a weight 21 and from thence back up over a pulley 22 and downwardly thru stop guides 23 and 24 into the housing 25 of the recording device. I fix upon the line between the stop members 23 and 24 a block 26 which is adapted to engage with either of the stop members 23 and 24 to limit the movement of the recording line.

The weight 21 is slidable upon a hollow guide member 27, which is extended from a point somewhat above the floor of the derrick downwardly to the derrick platform on which it is normally supported. Both ends of this tubular member are provided with flanges 28 to limit the movement of the weight 21 and the weight 29 thereon, both said weights being slidable on the guide member. The guide member itself is slidable upon a rod or cable 30, which is anchored at its lower end 31 in one of the sills of the derrick and extends the full length of the derrick and its upper end is anchored at 32 in the crown block.

Connected with the dead line 11 is a weight indicating mechanism 33 of ordinary construction and which, as it forms no part of the present invention, is not specifically shown. Suffice to say that the line 11 is passed between two stationary end members 34 and 35 upon the housing 33 of the weight indicator and is deflected around a movable post or plunger 36. Said plunger when depressed due to the weight upon the deadline will move the post or plunger 36 inwardly to actuate the weight indicator through a fluid conducting line 37 which extends below the derrick and into the housing 25 where a hand 38 upon a dial 39 is moved by the pressure of fluid in said line to indicate the amount of weight upon the cable. This is a common type of indicator, now well known.

The recording line 17 is shown in Figs. 3 and 4 as entering the upper end of the housing 25. Within the housing it passes over a pulley or sheave 40 mounted upon a shaft 41, rotatable in bearings 42 in the housing. From the pulley the line is passed downwardly and reeled about a drum 43.

The drum 43 is mounted upon a shaft 44 parallel with the shaft 41 and journaled in bearings in the side wall of the housing at a level below the shaft 41. Its end is extended through the wall of the housing and has on the outwardly extending end a drum 45 over which a line or cable 46 is wound, said line having a weight 47 depending downwardly from the drum or reel 45. It will be seen that this weight exerts a constant tension tending to rotate the shaft 44 and reel up a cable or line 17 on the drum 43.

Mounted on the shaft 41 within the housing is a beveled pinion 48, which engages a similar pinion 49 upon a threaded shaft 50. Said shaft is rotatable with the gear 49 within bearings 51 on the wall of the housing, the lower end of the shaft being rotatable at 52 in a cross brace or support 56 in the frame of the housing. Mounted upon the threaded portion of the shaft 50 is a nut 53 upon which is a laterally extending arm 54. Said arm has an opening therein to receive an upstanding guide post 55, which is anchored in the cross brace 56 of the frame.

At the end of the arm 54 is secured a rod 57 at the lower end of which is secured a stylus 58, as seen in Fig. 4, which is adapted to bear against a sheet 59 upon a rotatable drum 60.

The drum 60 is fixed at the upper end of a vertical shaft 61, which is supported in a cross brace 62 in the housing and has at its lower end a gear 63. Said gear 63 is adapted to engage with gears 64 connected with a spring operated clock mechanism 65. It will be understood that by means of the clock mechanism the drum 60 is rotated at a uniform speed supported upon the upper end of a sleeve 66 through antifriction bearings 67 thereon.

The operation of the weight indicator in its ordinary manner will rotate the shaft 68 to which the hand 38 is connected. To make a record of the weight upon the recording sheet 59 I place a pulley or pinion 69 on the outer end of the shaft 68 and then mount a smaller pulley 70 on the wall of the housing so as to engage against a rod 71 and hold the same against the pulley 69 in such manner that the rotation of the pulley will move the rod 71. The rod 71 may have rack teeth thereon to engage similar teeth on the pinion 69 to assure the proper movement of the rod by the pinion or pulley. At the upper end of the rod 71 is a stylus 72 positioned below the stylus 58 and adapted to make a record of the weight indicated by the weight indicator 38, 39.

Figure 7:
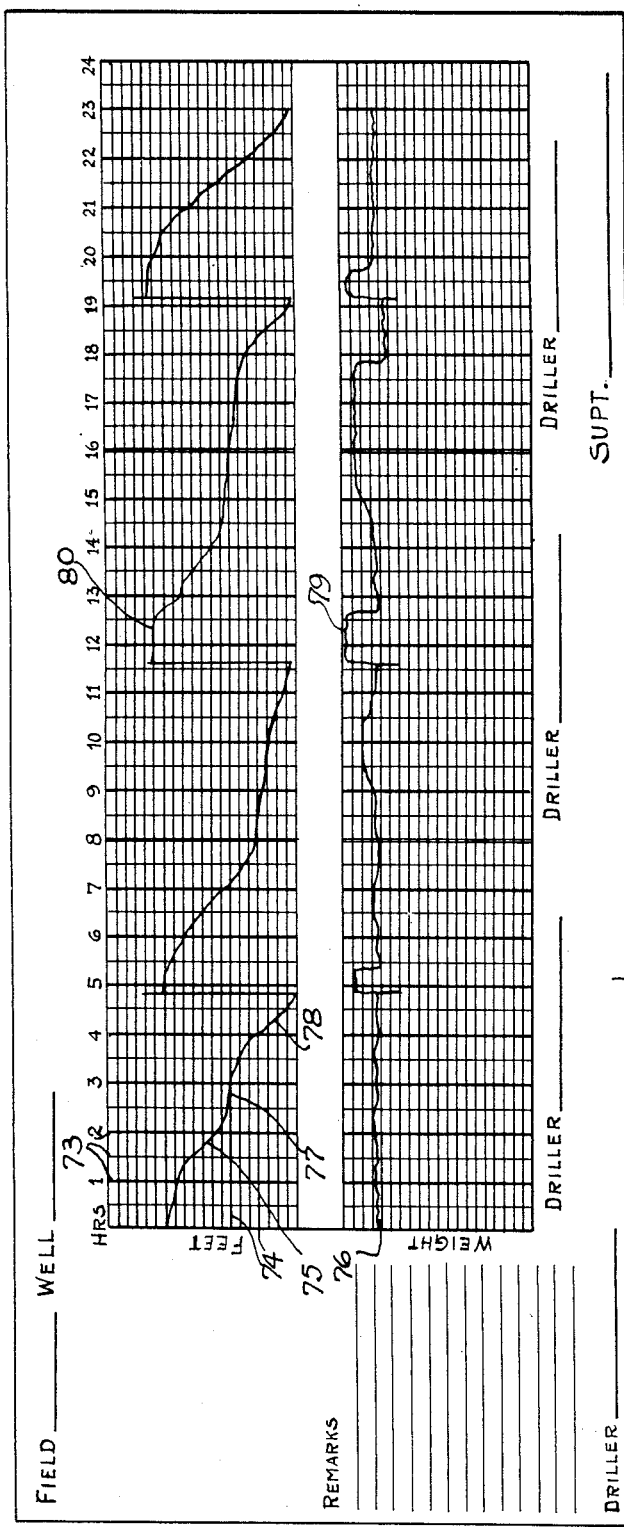
Fig. 7 is a plan view of a recording sheet employed in my device.

The operation of my device may be understood particularly in connection with Fig. 7 where a record sheet 59 taken from the drum 60 is shown. At the upper side of this sheet is a chart marked with coordinates, indicating by spaced vertical lines 73 the hours of drilling, and by spaced horizontal lines 74 the distance in feet through which the drill passes. On the lower portion of the record sheet are similar coordinates indicating weight upon the drill and the time that the drilling progresses. These two charts are arranged one under the other so that they may be compared to indicate the nature of the formation being drilled as well as the rate of penetration as controlled by the weight on the drill.

When the new section of drill stem is introduced into the string of drill stem in the well the traveling block will be raised upwardly toward the upper part of the derrick to allow the introduction of the new section. When this is done the line 17 will be drawn upwardly by the reeling up of the line 17 upon the drum 43 within the housing. This will raise the stylus or marking pin upwardly to the upper end of its movement indicated by the vertical lines on the upper chart in Fig. 7. When drilling then starts the pin will gradually travel downwardly along the chart as indicated by the line 75 in Fig. 7. Simultaneously the amount of weight resting on the drill will be recorded by the line 76 on the lower chart. With reference to the two lines it will be seen that the line 76 is comparatively constant, indicating that the weight resting on the drill varied but little. However, the drill did not progress downwardly at a uniform speed. At certain points it traveled faster than others and, as shown particularly at 77, the line flattened out somewhat to indicate that the bit was held up in its downward progress by encountering hard formation. At other places such as is indicated at 78, the drill progressed downwardly at a rapid rate indicating rather soft formation.

By further reference to this chart it will be seen that where the weight is not heavy upon the bit, as indicated at 79, the speed of drilling is also not rapid, as shown at 80. When the weight is increased, however, the speed of drilling also increases. By a comparison of these two graphs indicating speed of drilling and weight upon the bit a fairly good indication of the character of the formation being drilled may be seen.

In the handling of the drill stem where new sections in the drilling string have to be inserted the traveling block 10 may have to be lowered to the derrick platform during certain periods and an extra length of line must be provided, because the block 26 engages the stop 23 to prevent excessive movement of the stylus on the chart. Also, when the traveling block moves above its normal path of travel there will be some slack in the line because the block 26 engages the stop 24. The weight 47 will normally preserve a taut condition of the line 17 and, in case a greater amount of line is desired, the weight 21, together with the sleeve 27 and the lower weight 29, will be elevated above their normal position sliding along the rod 30 when the block 26 engages the stop 23. However, when the parts assume their normal position the weights will drop back to the position shown in the drawings. Slack in the line 17, when the block 26 engages the stop 24, if the traveling block moves above its normal path, is taken up by the weight 21 which will slide down the sleeve 27 to maintain the line taut.

The stop member 26 upon the line 17 is arranged to move through a distance between the stop members 23 and 24, which distance is only slightly in excess of the length of a section of drill stem. Thus when the block 26 engages with either of the stops the line can not move any further relative to the recording mechanism. Such further movement as is necessary is permitted by the movement of the weights 21 and 29.

It will be obvious that by the use of this device a very desirable type of log of the well may be obtained and preserved. It will be possible by making notations on the chart relative to the exact time and the depth which the drill penetrates to calculate easily where changes in the type of formation occur in the well and the degree of hardness of the formation may also be indicated. Some allowance may be made, of course, for the condition of the well drill which may be gradually dulled as the bit is used in drilling. The duller the bit becomes the slower of course will be the progress of the bit. The record, however, will be of value from a geological standpoint to indicate the nature of the formation, the straightness of the hole and the condition of the drilling tool as well as the effect of the weight on the rate of penetration. The record is made automatically without attention by the driller so that he may take advantage of the information recorded and it seems obvious that various advantages will be obtained from the device other than those above set out.

What I claim as new is:

1. In a rotary well drilling installation including a derrick and a traveling block suspended therein, the combination of a recording line connected with said block, a pulley at the upper end of said derrick over which said line is passed, a housing, a reel therein for said line, a rotating recording drum in said housing, a record sheet thereon, a pulley in said housing over which said line is engaged to rotate said pulley, a shaft rotated by said pulley and a stylus engaging said record sheet and actuated through the rotation of said shaft to move upon said sheet and record the downward movement of said traveling block.

2. In a well drilling installation including a derrick, a traveling block, a drill stem supported thereby, a cable connected with said traveling block and a reel to handle said cable whereby said drill stem may be raised and lowered, the combination of a recording line connected with said traveling block, means to reel up said recording line, a loop in said recording line, a weight supported in said loop and acting to take up slack in said line but permitting the increase of the normal length of said line, a stylus actuated by the movement of said line, a record sheet to be engaged by said stylus, and means to move said sheet uniformly.

3. In a rotary well drilling installation including a derrick and a traveling block suspended therein, the combination of a recording line connected with said block, a pulley at the upper end of said derrick over which said line is passed, a housing, a reel therein for said line, a pulley actuated by the movement of said line, a rotating recording drum in said housing, a record sheet thereon, a stylus actuated in response to the movement of said pulley to mark a record on said sheet of the speed of downward movement of said block, and means to limit the movement of said line.

GEORGE P. MIZELL.